United States Patent [19]

Jackson

[11] Patent Number: 4,993,702
[45] Date of Patent: Feb. 19, 1991

[54] APPARATUS FOR VARIABLY ACCELERATING A DRIVE MEMBER

[75] Inventor: John C. Jackson, Preston, United Kingdom

[73] Assignee: Rockwell Graphic Systems Limited, Lancashire, United Kingdom

[21] Appl. No.: 374,629

[22] Filed: Jun. 30, 1989

Related U.S. Application Data

[63] Continuation of Ser. No. 81,865, Aug. 5, 1987, abandoned.

[30] Foreign Application Priority Data

Aug. 11, 1986 [GB] United Kingdom ............... 8619504

[51] Int. Cl.⁵ .............................................. B65H 5/34
[52] U.S. Cl. ..................................... 271/270; 271/82; 271/202; 271/277; 475/14
[58] Field of Search ........ 271/187, 270, 202, 307–308, 271/312, 314–315, 82; 198/462, 470.1, 577; 74/393, 394, 750 R, 781 R, 793; 475/14

[56] References Cited

U.S. PATENT DOCUMENTS

| | | | |
|---|---|---|---|
| 1,033,968 | 7/1912 | Waldron | 53/215 X |
| 1,063,336 | 6/1913 | Duncan | 271/116 X |
| 1,365,534 | 1/1921 | Neihart | 271/126 |
| 2,084,783 | 6/1937 | Seybold | 271/270 X |
| 2,248,079 | 7/1941 | Harrold et al. | 271/270 X |
| 2,399,493 | 4/1946 | Luehrs et al. | 74/394 |
| 2,535,774 | 12/1950 | Armelin | 74/394 |
| 2,715,975 | 8/1955 | Doane et al. | 271/10 X |
| 2,956,801 | 10/1960 | Coakley | 271/34 X |
| 3,363,482 | 1/1968 | Case | 74/793 X |
| 3,596,903 | 8/1971 | Jurny | 271/270 |
| 3,598,399 | 8/1971 | Cottrell | 271/149 X |
| 3,777,903 | 12/1973 | Kuckhermann | 414/926 X |
| 3,830,144 | 8/1974 | Kuckhermann et al. | 414/926 X |
| 3,871,645 | 3/1975 | Buttner et al. | 271/270 |
| 3,894,732 | 7/1975 | Muller | 271/10 |
| 3,955,435 | 5/1976 | Arick | 74/793 X |
| 3,960,079 | 6/1976 | Capetti | 271/270 X |
| 4,269,076 | 5/1981 | Obra . | |
| 4,334,440 | 6/1982 | Fonck | 74/793 X |
| 4,569,240 | 2/1986 | Obra | 74/52 X |
| 4,800,813 | 1/1989 | Leyenpecker et al. | 271/82 X |
| 4,825,762 | 5/1989 | Fischer | 271/270 X |

FOREIGN PATENT DOCUMENTS

| | | | |
|---|---|---|---|
| 0049470 | 4/1982 | European Pat. Off. . | |
| 0075057 | 3/1983 | European Pat. Off. . | |
| 1129029 | 11/1962 | Fed. Rep. of Germany . | |
| 2607503 | 9/1976 | Fed. Rep. of Germany | 271/270 |
| 3508186 | 9/1985 | Fed. Rep. of Germany . | |
| 2050828 | 4/1971 | France . | |
| 2558556 | 7/1985 | France . | |
| 0269829 | 11/1987 | Japan | 271/150 |
| 0057441 | 3/1988 | Japan | 271/119 |
| 1395725 | 5/1975 | United Kingdom . | |

Primary Examiner—H. Grant Skaggs
Assistant Examiner—Boris Milef
Attorney, Agent, or Firm—Darby & Darby

[57] ABSTRACT

Apparatus for variably accelerating a rotatable drive member comprises a slotted drive member mounted to rotate a drive shaft. A sun gear has two opposingly situated planet gears mounted to mesh with the sun gear. A driven annular gear rotates the planet gear. Each planet gear includes a cam member mounted to each planet gear off axis relative thereto. The cam members are received in the slotted drive member. As the annular gear is driven with angular velocity omega the cam members travel towards and away from the sun gear as they orbit around the sun gear. This movement causes the rotational movement applied to the drive member to vary between a maximum and a minimum angular velocity. Consequently, it is possible to arrange the apparatus to receive a rapidly moving product and slow it down before delivery onto a conveyor.

6 Claims, 7 Drawing Sheets

APPARATUS FOR VARIABLY ACCELERATING A DRIVE MEMBER

This is a continuation of application Ser. No. 081,865, filed Aug. 5, 1987, now abandoned.

BACKGROUND OF THE INVENTION

1. Field of the Invention

This invention relates to apparatus for variably accelerating a rotatable drive member and in particular to a decelerating apparatus for receiving a high speed product and delivering it at a relatively lower speed. More particularly, the invention relates to an apparatus for decelerating printed copies received from a folding mechanism which are then to he delivered at a relatively lower speed onto and synchronous with a conveyor belt on which the copies must be laid in a controlled manner.

In printing newspapers or the like, the printed copies are folded by a folding mechanism and emitted therefrom at high speed. Typically, the direction of travel of the emitted printed copy must then be changed through 90° and also the speed of the copy reduced to the lower speed of a conveyor belt on which the copies must be laid in a controlled manner. Thus, there is a need for an apparatus to both receive the high speed copies and decelerate them in a controlled manner and to deliver the slower moving copies onto a conveyor belt in a neat fashion without intefering with the laid copies.

2. Description of the Prior Art

Prior art slow down apparatus bas employed designs to slow down the copies by impacting upon slower moving and or static stops leading to uncontrolled slowing down of the copies which can cause damage. Thus, the slow down apparatus has been unable to achieve the required performance characteristics with controlled copy kinematics. At the same time, the complex prior art slow down apparatus ar both difficult and expensive to produce. There is therefore a need for an apparatus to provide controlled deceleration of the copy.

SUMMARY OF THE PRESENT INVENTION

It is therefore an object of the present invention to provide a copy deceleration apparatus giving controlled deceleration of the copy and which is simple to manufacture.

According to the invention there is provided apparatus for variably accelerating a rotatable drive member. The apparatus comprising a planetary gear system having a sun gear with planet gear arranged to orbit therearound in use, a rotation element located off axis relative to the planet gear axis but being rotatably driven by the planet gear orbitting and the drive member being linked for rotation by the movement of the rotation element.

In this way, the drive member rotates with a variable velocity between a maximum and minimum velocity. Thus, the acceleration of the drive member is variable. It will be appreciated that the term "variable acceleration" encompasses the term positive acceleration, and negative acceleration or deceleration. The variable velocity movement of the drive member can be employed in many ways to accelerate products or decelerate them.

In operation, the orbit velocity about the sun gear axis of the rotation element is greater when Its passage with regard to the planet gear is remote from the axis of the sun gear. The minimum orbit velocity about the sun gear axis occurs when the planet gear rotation during orbit brings the rotation element closest to the sun gear. As an example of the use of the present invention the drive member can be arranged to rotate a drive shaft operating a belt system which may be employed in an apparatus to decelerate printed copies received from a folding mechanism. Alternatively, the drive member can be employed to accelerate copies within known conveyor and bundling equipment in the printing industry.

Preferably, the rotation element comprises at least one cam, a single cam being rotatably mounted on the or each planet gear: and the drive member is rotatably mounted on the sun gear axis and includes slot means formed for slidably receiving the or each cam. Thus, as the cam rotates about the planet gear axis, it acts to cause the drive member to rotate about the sun gear axis and at the same time slides towards and away from the sun gear axis within the slot means. By harnessing the movement of the cam rotation about the sun gear axis by means of the drive member, the rotation of the drive member has a variable velocity about sun gear axis, inbetween a maximum and minimum velocity. Consequently, any indirectly or directly driven gear can be simply arranged to catch products at a high speed and deliver them at a low speed or catch products at a low speed and deliver them at a high speed. The choice of direct and indirect drive will be apparent to a person skilled in the art.

An alternative apparatus has the rotation element comprising at least one crank, a single crank having one end mounted to the axis of the or each planet gear and the other end of the crank being offset relative to the planet gear axis: and the drive member is rotatably mounted on the sun gear axis and is rotated by the movement of said other end of the or each crank.

In addition, the other end of the or each crank can include a cam and the drive member can include a slot means formed for slidably receiving the or each cam. Alternatively, the drive member can include slide means capable of sliding movement towards and away from the sun axis, the slide means receiving the other end of the crank. This latter embodiment provides more uniform kinematics.

In a preferred embodiment of the invention, two planet gears are provided, preferably on opposite sides of the sun axis. Consequently, the movement of the rotation elements is balanced about the sun gear as the drive member rotates.

In a preferred embodiment of the invention a further drive member is rotatably mounted on the sun gear axis, the further drive member being linked for rotation by one or more further rotation elements mounted offset to the or each planet gear in a manner to provide rotational movement in counterpoint to the movement from the or each first mentioned rotation element on that planet gear. Alternatively, a further drive member is rotatably mounted on the sun gear axis. The further drive member being linked for rotation by one or more rotation elements each mounted to a respective extra planet gear arranged to orbit the sun gear, the further rotation elements being mounted on the extra planet gear offset relative to the extra planet gear axis to provide rotational movement in counterpoint to the movement from the or each first mentioned rotation element. These embodiments have the advantage that a variable velocity between a maximum and a minimum velocity can be provided which is directly opposite to that provided from the first mentioned rotation elements. Conveniently, the further drive member can be mechanically linked to a counterbalance provided to balance inertia changes transmitted to the first mentioned drive member. Thus, a counter weight can be simply provided and driven by the further drive member, which counterweight movement reduces the stresses on the apparatus resulting from changes in energy given and received by elements rotated by the drive member, which changes result from the variable rotation velocity thereof.

Preferably, the first mentioned drive member is mechanically linked to drive a drive shaft having mounted thereon gripper means defining a circumferential path about the drive shaft during rotation, the gripper means being operable to grip and release a received product during passage about the circumferential path. The gripper means are conveniently mounted on at least two hubs fixedly mounted on said drive shaft, each hub including a respective gripper means for gripping a received product and wherein the space between said hubs is adjusatible along the drive shaft In this way, it is possible to arrange for a product to be gripped by the gripper means at a particular position during the circumferential path and for the gripper means to release a received product at a further position around said path. At the same time, the width of the product received can be simply changed by the movement of the hubs along the path in a manner to optimize the gripping effect dependent on the size of the received product.

Preferably, the apparatus comprises a printed product decelerating apparatus.

It can be seen from the above embodiments that the present apparatus is considerably simpler than hitherto known apparatus thereby reducing the cost of the apparatus and improving the effectiveness of the deceleration of the received products. It should be noted that if the gripper means is arranged to release the received product at the gripper means minimum velocity point, then immediately thereafter, the gripper means accelerates away from the released product thereby ensuring a clean release of the product.

BRIEF DESCRIPTION OF THE DRAWINGS

An example of the present invention will now be described with reference to the accompanying drawings. in which.

It will be apparent from the drawings referred to above, that the illustrations of apparatus are schematic in nature and not to scale.

DETAILED DESCRIPTION OF THE DRAWINGS

Figure 1:
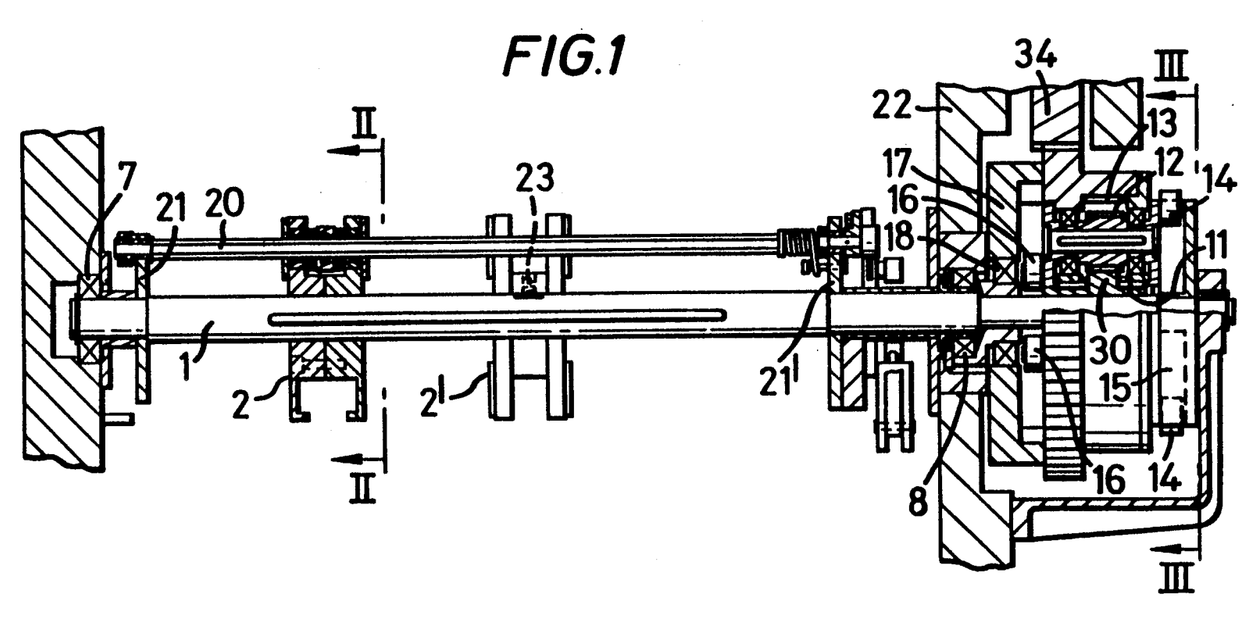
FIG. 1 illustrates a cut away view through a apparatus embodying the present invention.
Figure 2:
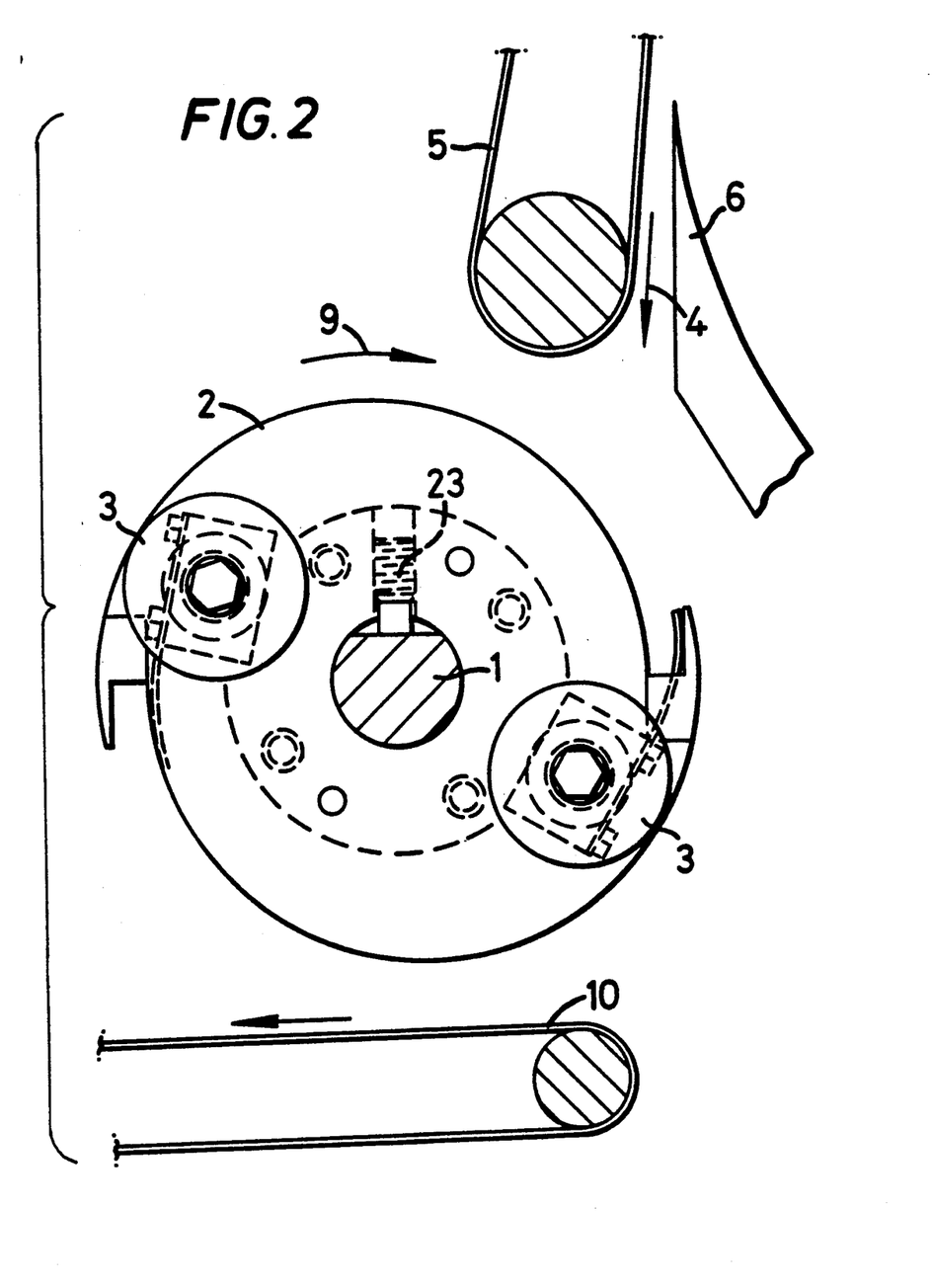
FIG. 2 illustrates a sectional view along arrows II—II.

Referring to FIGS. 1 and 2, a drive shaft 1 has mounted thereon a pair of hubs 2, 2', each with a pair of gripping arrangements 3 provided at opposing circumferential positions. These have been omitted from FIG. 1 for the purposes of clarity. Each of the hubs 2 are located onto the shaft 1 and ar also fixed to a further shaft 20 extending between end plates 21 and 21' which are mounted to the drive shaft 1 so that the shaft 20 rotates with the hubs 2 and 2'. The hubs 2 and 2' are slidably mounted on the shaft 1 but are locked to the rotation of the shaft 1 by means of a key screw 23 in shaft 1. The position of the hubs 2 and 2' on the shaft 20 can be adjusted by releasing the key screw 23 which can be urged into contact with the shaft 1 to lock the position of the hub 2 to the position on the shaft 1. A similar adjusting means can also be provided on the hub 2' but has been omitted from FIG. 1 for the purposes of clarity. Consequently, the distance between the two hubs 2 and 2', and hence the gripping means thereon can be adjusted to allow different width printed copies to be received by the apparatus.

As can be seen from FIG. 2, a printed product, for example, is that issuing from a folding cylinder making a first cross fold, which then sends the printed product in the direction of arrow 4 between a conveyor belt 5 and a fixed side member 6. The printed product falls with high velocity to be received by one of the respective grippers 3 mounted on the hubs 2 and 2'. Typically, the grippers 3 are arranged to be in their open position when they rotate to a position of about 4 O'Clock relative to the upward direction of FIG. 2. As will be apparent to a person skilled in the art, by means of suitable cams, the gripper means 3 are arranged to close immediately thereafter so that a printed product is gripped between the gripper 3 and the outer circumference of the hubs 2, 2'.

The shaft 1 is mounted for rotation in bearings 7 at one end towards plate 21 and bearings 8 at the other end towards plate 21'. Thus, rotation of the shaft 1 also rotates the hubs 2 and 2'. As the gripper means 3 rotate in the direction of arrow 9 shown in FIG. 2, then when the gripper means attain a position at approximately 7 O'Clock, the cam arrangement is arranged to cause the gripper means to open so that the printed product held therein is delivered onto a conveyor belt 10 located immediately below the hubs. It can be seen that the cams are arranged to close and open the gripper means 3 at approximately 90° intervals around the axis of the drive shaft 1. It will be apparent that the copy is positively gripped throughout the deceleration process so that the copy cannot deviate from its prescribed path.

The printed product emerging in the direction of arrow 4 has a considerable velocity compared with the velocity of the conveyor belt 10. Thus, the rotation of the hubs 2 and 2' needs to be variable to accept the product from the direction of arrow 4 with a high velocity but to then slow rotational movement to deliver the printed product to the conveyor belt with substantially the same speed as that of the conveyor belt 10. This receipt and delivery must also occur with a predetermined periodicity. Thus, the drive shaft 1 must be driven in order to achieve an angular velocity profile of the grippers 3 substantially as that shown in FIG. 4.

Figure 3:
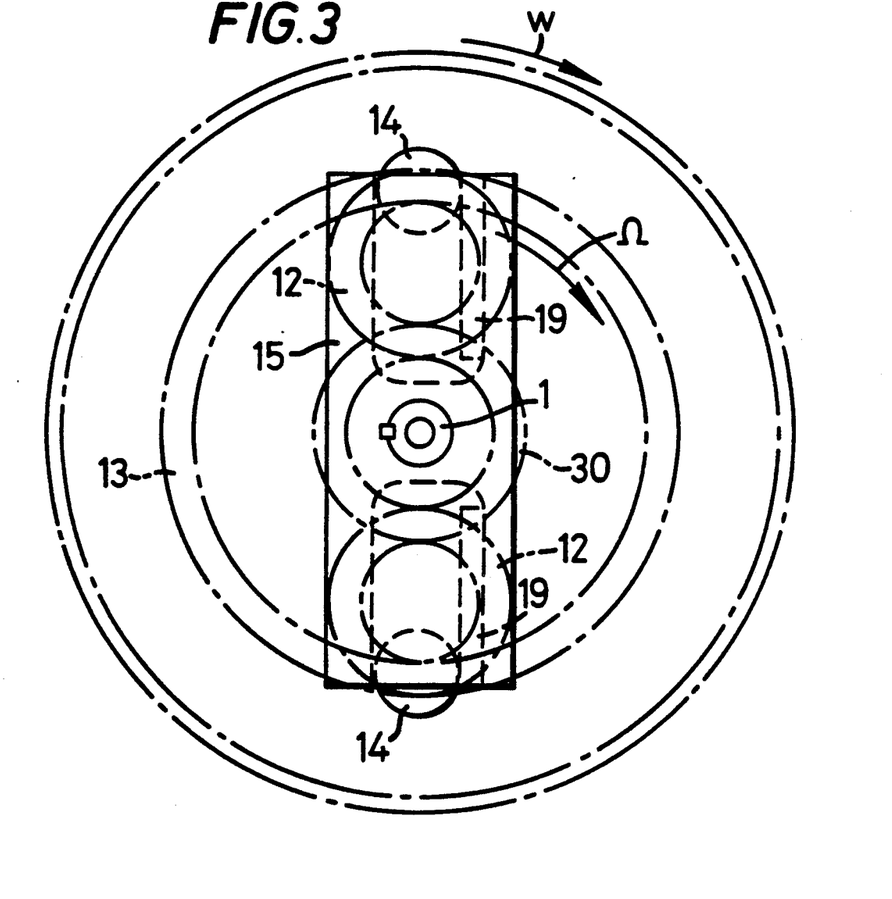
FIG. 3 illustrates a view along arrows III—III shown in FIG. 1

Referring to FIGS. 1 and 3, a planetary gear system is provided around the shaft 1. A fixed sun gear 30 is mounted on bearings 11 so that the sun gear does not rotate with the drive shaft 1. Two opposingly situated planet gears 12 are mounted to mesh with the sun gear 30 and are driven by an annular gear 13. This annular gear is driven by an external gear 34 with a rotational velocity w. Each planet gear has a cam member 14 mounted off axis in a symmetrical manner with each other. A slotted drive member 15 is fixed to the drive shaft 1 in a manner whereby the slots receive the cam members 14 which typically comprise rotatable discs.

In operation, the annular gear 13 is driven with an angular velocity w which imparts rotation to the planet gears 12. The rotation of the planet gear causes the cam members 14 to act on the drive member 15 to rotate it with an angular velocity omega.

It will be apparent that as the planet gears rotate, the cam members 14 travel towards and away from the sun gear 30 as well as orbiting therearound. This movement causes the actual rotational movement applied to the drive member 15 to vary. Maximum and minimum angular velocity are determined from the following formula, where "r" is negative at its closest position to shaft 1.

$$w + \frac{2wr}{R+r}$$

Where
R = radius of the planet gear orbit about shaft 1
r = radius of disc cam members 14. (negative when pointing toward shaft 1)

Figure 4:
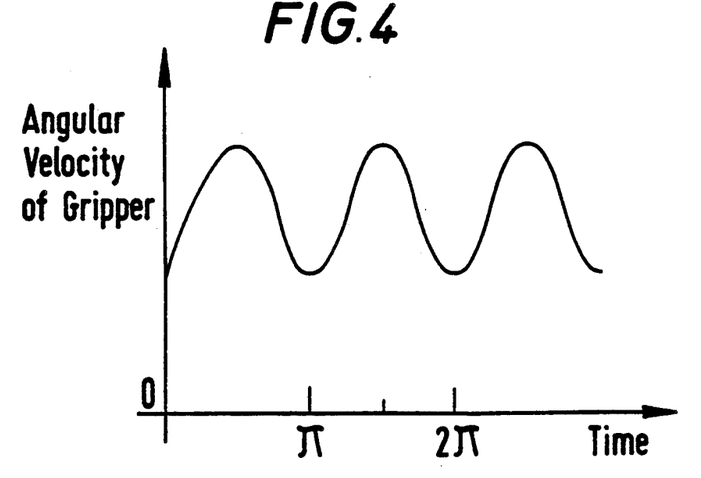
FIG. 4 illustrates the velocity profile of the gripper means against time.

Thus, the drive member 15 executes a velocity pattern identical with that of FIG. 4 and since the drive member 15 is fixed to the drive shaft 1, the rotation of the drive member 15 is replicated in the rotation of the hubs 2 and 2'. It will be apparent that the rotation of the drive member 15 could be achieved by the use of one planet gear or alternatively four planet gears phased together to give the same effect.

It can be seen from FIG. 1 that each planetary gear 12 includes a further cam member 16 mounted thereon so that when the cam member 14 is at its most remote position from the sun gear 1, the cam members 16 are located closest to the sun 30. A corresponding slotted drive member 17 is mounted on bearings 18 for rotation about the drive shaft 1. The drive member 17 includes a slot to receive the cam members 16 so that the cam members act thereon to rotate the drive member 17. The drive member 17 is fixed to a counter weight 22 balancing the inertia of the hubs 2 and 2'. The rotation of the drive member 17 by the cams 16 is out of phase with the rotation of the drive member 15 so that the rotation of the counter balance 22 balances the rotation changes of the hubs 2 and 2', that is to say when the hubs 2 and 2' slow down, the counter balance speeds up and vice versa. The counter balance receives the energy given up by the hubs in the first half of the cycle and returns that energy to those masses as they accelerate in the second half of the cycle. In this way, the effects of stress on the apparatus resulting from the energy changes in hubs 2 and 2' are reduced Both drive members 17 and 15 can include shims 19, as shown in FIG. 3, which are employed to eliminate back lash in the rotation. Typically, the maximum speed of the grippers is approximately 20–25% slower than the printed products being received in order to assure suitable docking between the gripper and the printed copy. The opening and closing of the gripper means 3 are not illustrated since the action of these do not impinge on the invention. Typically though the grippers are opened and closed by means of a cam follower arrangement driven by the main shaft 1.

It will be apparent that the preferred embodiment of the invention includes gripper means opened and closed by suitable cam arrangement. However, it is within the scope of a person skilled in the art to design an alternative means of catching the product and releasing it, either catching at the high velocity and releasing at low velocity or catching at low velocity and releasing at high velocity.

Figure 6A:
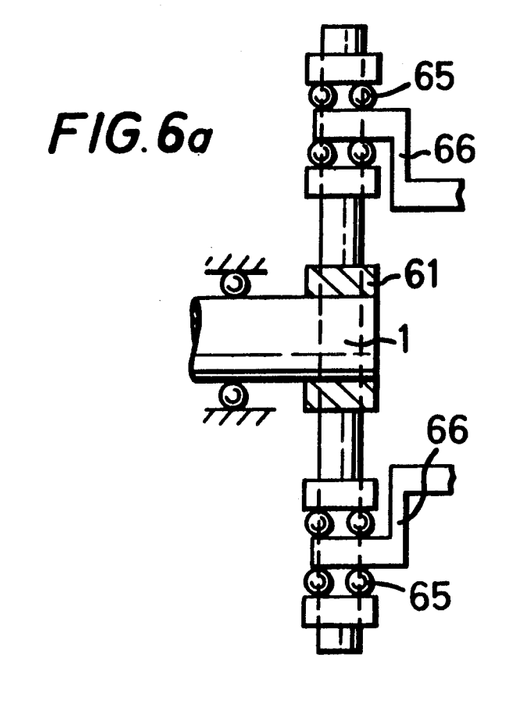
FIGS. 6a, 6b illustrate a portion of a further apparatus embodying the present invention in front and side views.
Figure 6B:
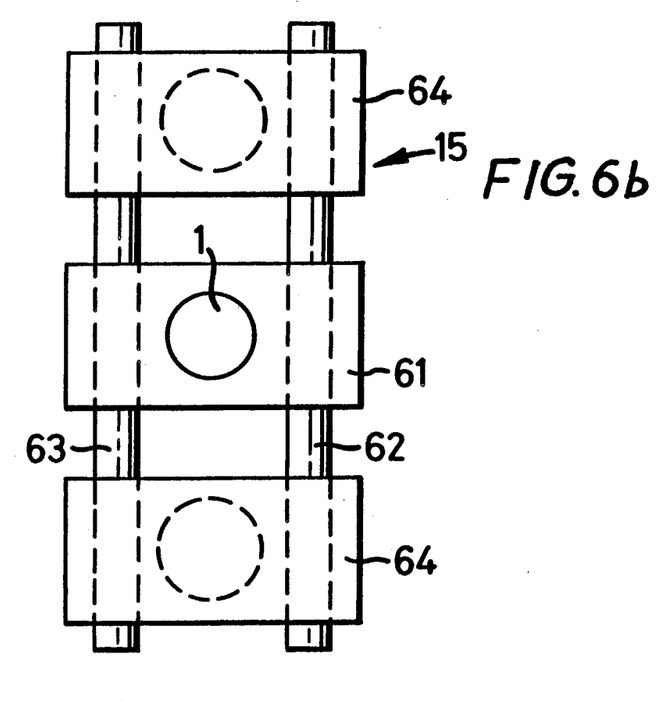
Figure 8:
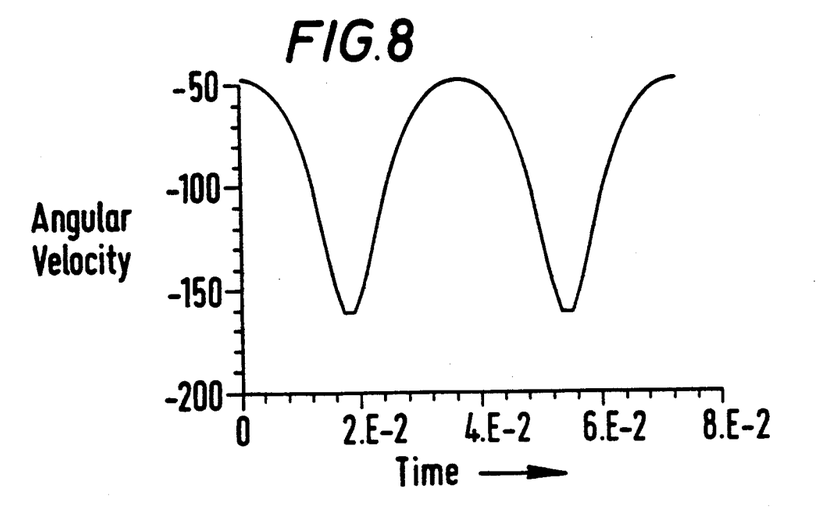
FIG. 8 illustrates the angular velocity of a gripper means driven by the apparatus shown in FIG. 5.
Figure 10:
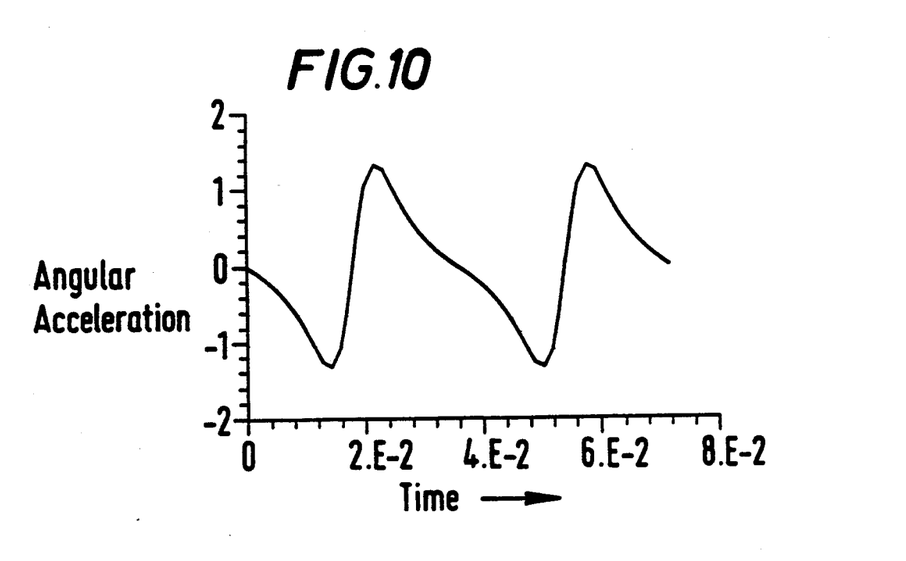
FIG. 10 illustrates the angular acceleration of a gripper means driven by the apparatus shown in FIG. 5.

Referring to FIG. 6, there is shown therein an alternative drive member. In FIG. 6, the same reference numerals as shown in FIGS. 1 to 3 have been employed. In this example, the drive member comprises a drive block 61 fixed to the drive shaft 1. The rotation of the drive member 15 is replicated in the rotation of the hubs 2 and 2'. The drive block 61 has a pair of fixed rods 62 and 63 each slidably mounting slide blocks 64. As can be seen from the side view shown in FIG. 6, each block 64 includes a bearing 65 for receiving one end of a crank 66. Each crank 66 is fixed to the axis of a respective planet gear 12. It will be apparent that the location of the crank in bearing 65 is offset relative to the axis of the planet gear 12. As the planet gear 12 rotates, the crank 66 forces the slide blocks 64 to move towards and away from the sun gear axis. In so doing, the drive member 15 rotates drive shaft 1 to produce an angular velocity and acceleration pattern of an attached gripper mechanism substantially as shown in FIGS. 8 and 10. In summary, as the drive member 15 rotates under the action of the crank 66, the slide blocks 64 slide towards and away from the sun axis along rods 62 and 63. This embodiment of the invention has advantages over the embodiment shown in FIG. 3 since the kinematics of the rotation are more balanced and less likely to lead to wear.

Figure 5:
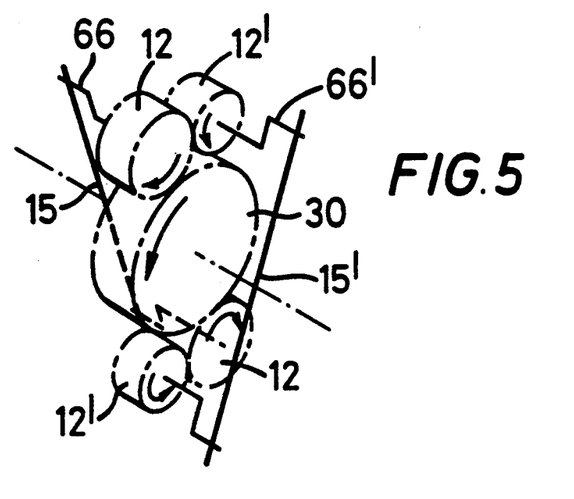
FIG. 5 illustrates an alternative embodiment of the planet gear providing drive for a counterbalance.
Figure 7:
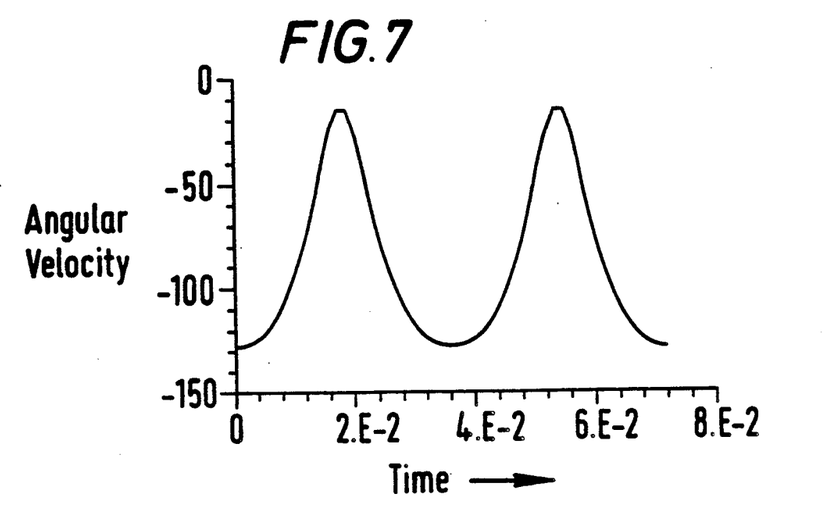
FIG. 7 illustrates the angular velocity variation of a counterbalance driven by the apparatus shown in FIG. 5.
Figure 9:
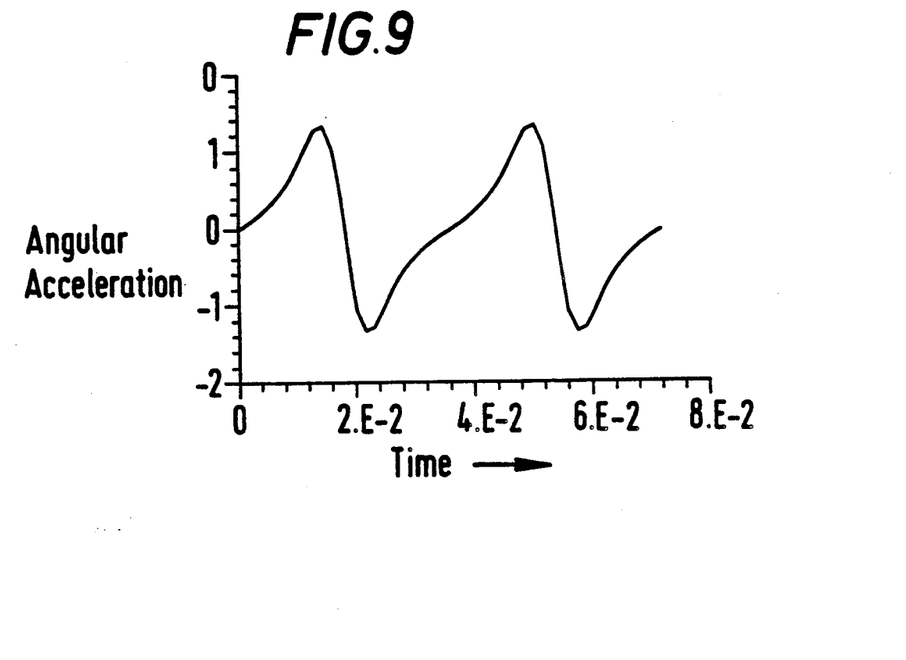
FIG. 9 illustrates the angular acceleration of the counterbalance driven by the apparatus shown in FIG. 5.

FIG. 5 illustrates the embodiment of FIG. 6 wherein a further means of driving a counterbalance is provided. Refering to the embodiment of FIG. 5, the sun gear 30 includes a pair of first planet gear 12 substantially as shown in FIG. 3 and also further planet gear 12' which is meshed with the planet gear 12. The planet gear 12 includes the pair of cranks 66 to rotate drive member 15 whereas the planet gear 12' includes cranks 66' which are arranged in a similar manner to that shown in FIG. 6 but drive a further drive member schematically represented by the numeral 15'. The crank 66' is arranged in an opposite sense to that of crank 66, so that the drive member 15 has a rotational movement which is in counterpoint to the movement from the drive member 15. Thus, when the drive member 15' is attached to a counterbalance, the angular velocity and acceleration pattern is as shown in FIGS. 7 and 9 respectively which can be seen to be in opposition or in counterpoint to the angular velocity and acceleration pattern of a gripper means driven by the drive member 15.

It will be apparent that the motion of the drive elements in FIG. 6 is still essentially governed by the aforementioned equation except that r is now equal to the radius of the movement defined by the crank motion 66. The advantage of the embodiments shown in FIGS. 5 and 6 is that the configuration produces smoother dynamics between the apparatus and the counterbalance because the kinematics of the former will be more accurately mirrored by the latter, as can be seen from the graphs shown in FIGS. 7 to 10.

It will be apparent that the present invention can take many different forms, which will be apparent to a person skilled in the art. For example, by suitable selection of the gearing of planetary gears 12 and sun gear 30 and annular gear 13 different numbers of velocity peaks can be produced during a single rotation of the hubs 2 and 2'. It will also be apparent that the invention is preferably for use in the printing industry for receiving printed products in the grippers 3. However, it will be apparent that the invention of receiving a rapidly moving product and slowing it down before delivery onto a conveyor means applies to many products.

What we claim is:

1. An apparatus for processing sheets which includes a device for receiving sheets moving at a first velocity and for delivering them to a conveying mechanism operating at a substantially different velocity, said device including a rotatable drive member for accelerating or decelerating such sheets in order to present them to said conveying mechanism at a compatible velocity, the drive member being operated by apparatus comprising a planetary gear system having a sun gear with planet gear arranged to orbit therearound in use, said planet gear and sun gear each having an axis, a rotation element having an end located off axis relative to the axis of said planet gear but being rotatably driven by the planet gear orbiting, and said drive member being linked for rotation by a movement of said rotation element, wherein the movement of the drive member follows a predefined velocity and acceleration profile which repeats itself periodically, said device including a further drive member rotatably mounted on the axis of said sun gear, the further drive member being linked for rotation by one or more further rotation elements, each mounted to a respective further planet gear arranged to orbit around the sun gear, the further rotation element each having an end located off axis relative to their respective further planet gears to provide rotational movement in counterpoint to a movement from the rotation element.

2. Apparatus as claimed in claim 1 wherein the further drive member is mechanically linked to a counter balance provided to balance inertia changes transmitted to the first mentioned drive member.

3. Apparatus as in claim 1 including a plurality of planet gears and a plurality of rotation elements.

4. An apparatus as in claim 1, wherein the drive member is mechanically linked to drive a drive shaft having mounted thereon gripper means defining a circumferential path about the drive shaft during rotation, the gripper means being operable to grip and release a received product during passage about the circumferential path.

5. An apparatus as claimed in claim 1, wherein the rotation element comprises a crank having a first end mounted to the axis of the planet gear and a second end of the crank being offset relative to the planet gear axis; and the drive member being rotatably mounted on the sun gear axis and being rotated by the movement of said second end of the crank.

6. An apparatus as in claim 5, wherein a plurality of cranks and planet gears are provided, the drive member being rotated by movement of said cranks.

* * * * *